United States Patent
Lee et al.

(10) Patent No.: US 10,306,424 B2
(45) Date of Patent: May 28, 2019

(54) METHOD AND APPARATUS FOR HANDLING L2 ENTITY IN CONTINUITY BETWEEN SC-PTM TRANSMISSION AND MBSFN TRANSMISSION IN WIRELESS COMMUNICATION SYSTEM

(71) Applicant: LG ELECTRONICS INC., Seoul (KR)

(72) Inventors: Youngdae Lee, Seoul (KR); Sangwon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/563,030

(22) PCT Filed: Apr. 11, 2016

(86) PCT No.: PCT/KR2016/003769
§ 371 (c)(1),
(2) Date: Sep. 29, 2017

(87) PCT Pub. No.: WO2016/163837
PCT Pub. Date: Oct. 13, 2016

(65) Prior Publication Data
US 2018/0054714 A1    Feb. 22, 2018

Related U.S. Application Data

(60) Provisional application No. 62/145,495, filed on Apr. 9, 2015.

(51) Int. Cl.
*H04W 4/06* (2009.01)
*H04W 76/19* (2018.01)
(Continued)

(52) U.S. Cl.
CPC ......... *H04W 4/06* (2013.01); *H04W 36/0007* (2018.08); *H04W 76/19* (2018.02); *H04W 76/40* (2018.02); *H04L 12/189* (2013.01)

(58) Field of Classification Search
CPC ...................................................... H04W 4/06
See application file for complete search history.

(56) References Cited

U.S. PATENT DOCUMENTS 8,259,636 B2 * 9/2012 Hus .................. H04L 1/1607
                                                                370/312
8,400,939 B2 * 3/2013 Kim .................. H04W 48/16
                                                                370/252
(Continued)

OTHER PUBLICATIONS

ZTE et al., "MCCH structure for Single-cell PTM transmission", R2-150361, 3GPP TSG RAN WG2 #89, Athens, Greece, Feb. 9-13, 2015, pp. 1-2.
(Continued)

*Primary Examiner* — Parth Patel
(74) *Attorney, Agent, or Firm* — Dentons US LLP

(57) ABSTRACT

A method and apparatus for handling a L2 entity in a wireless communication system is provided. A user equipment (UE) receives a service via a first transport channel, changes a type of a transport channel from the first transport channel to a second transport channel, determines whether to re-establish a L2 entity, and receives the service via the second transport channel.

7 Claims, 13 Drawing Sheets

(51) Int. Cl.
*H04W 76/40* (2018.01)
*H04W 36/00* (2009.01)
*H04L 12/18* (2006.01)

(56) References Cited

U.S. PATENT DOCUMENTS

| | | | | |
|---|---|---|---|---|
| 10,045,328 | B2* | 8/2018 | Mizusawa | H04W 72/005 |
| 2008/0316952 | A1* | 12/2008 | Gruber | H04W 72/005 |
| | | | | 370/312 |
| 2009/0122740 | A1* | 5/2009 | Bouazizi | H04W 72/005 |
| | | | | 370/312 |
| 2010/0103854 | A1* | 4/2010 | Lee | H04W 72/005 |
| | | | | 370/312 |
| 2010/0232340 | A1* | 9/2010 | Godor | H04H 20/57 |
| | | | | 370/312 |
| 2010/0272004 | A1* | 10/2010 | Maeda | H04L 5/0007 |
| | | | | 370/312 |
| 2010/0309836 | A1* | 12/2010 | Sugawara | H04W 72/1231 |
| | | | | 370/312 |
| 2011/0038299 | A1* | 2/2011 | Sugawara | H04L 12/189 |
| | | | | 370/312 |
| 2011/0077006 | A1* | 3/2011 | Hsu | H04W 36/08 |
| | | | | 455/436 |
| 2011/0092240 | A1* | 4/2011 | Aiba | H04L 1/0025 |
| | | | | 455/509 |
| 2011/0103288 | A1* | 5/2011 | Lee | H04W 48/12 |
| | | | | 370/312 |
| 2011/0243056 | A1* | 10/2011 | Jen | H04L 5/0007 |
| | | | | 370/312 |
| 2011/0292861 | A1* | 12/2011 | Gou | H04W 76/40 |
| | | | | 370/312 |
| 2011/0305183 | A1* | 12/2011 | Hsu | H04W 72/005 |
| | | | | 370/312 |
| 2011/0305184 | A1* | 12/2011 | Hsu | H04L 65/4076 |
| | | | | 370/312 |
| 2012/0039237 | A1* | 2/2012 | Liang | H04W 72/005 |
| | | | | 370/312 |
| 2012/0044851 | A1* | 2/2012 | Wang | H04W 72/005 |
| | | | | 370/312 |
| 2012/0044854 | A1* | 2/2012 | Chen | H04W 56/00 |
| | | | | 370/312 |
| 2012/0099419 | A1* | 4/2012 | Kim | H04L 1/1854 |
| | | | | 370/216 |
| 2012/0134311 | A1* | 5/2012 | Zhai | H04L 12/1818 |
| | | | | 370/312 |
| 2012/0155361 | A1 | 6/2012 | Wei et al. | |
| 2012/0236776 | A1* | 9/2012 | Zhang | H04W 48/12 |
| | | | | 370/312 |
| 2012/0263043 | A1* | 10/2012 | Xu | H04W 72/005 |
| | | | | 370/241 |
| 2012/0281610 | A1* | 11/2012 | Ai | H04W 8/205 |
| | | | | 370/312 |
| 2012/0314642 | A1* | 12/2012 | Xu | H04W 48/16 |
| | | | | 370/312 |
| 2012/0322447 | A1* | 12/2012 | Ramachandran | H04W 48/18 |
| | | | | 455/436 |
| 2013/0028161 | A1* | 1/2013 | Maeda | H04L 5/0048 |
| | | | | 370/311 |
| 2013/0035129 | A1* | 2/2013 | Wei | H04W 4/06 |
| | | | | 455/517 |
| 2013/0051298 | A1* | 2/2013 | Drevo | H04W 36/0083 |
| | | | | 370/312 |
| 2013/0163500 | A1* | 6/2013 | Na | H04W 72/005 |
| | | | | 370/312 |
| 2013/0229974 | A1* | 9/2013 | Xu | H04W 4/06 |
| | | | | 370/312 |
| 2013/0242845 | A1* | 9/2013 | Kone | H04W 76/40 |
| | | | | 370/312 |
| 2013/0286929 | A1* | 10/2013 | Tsuboi | H04W 72/005 |
| | | | | 370/315 |
| 2013/0301509 | A1* | 11/2013 | Purnadi | H04L 65/4076 |
| | | | | 370/312 |
| 2013/0308516 | A1* | 11/2013 | Zeng | H04L 5/0098 |
| | | | | 370/312 |
| 2013/0336173 | A1* | 12/2013 | Mandil | H04W 36/0072 |
| | | | | 370/280 |
| 2014/0051426 | A1* | 2/2014 | Siomina | H04W 36/0088 |
| | | | | 455/422.1 |
| 2014/0140237 | A1* | 5/2014 | Ma | H04W 24/08 |
| | | | | 370/252 |
| 2014/0169255 | A1* | 6/2014 | Zhang | H04W 72/005 |
| | | | | 370/312 |
| 2014/0301267 | A1* | 10/2014 | Gou | H04W 48/08 |
| | | | | 370/312 |
| 2015/0063277 | A1 | 3/2015 | Yamada et al. | |
| 2015/0334769 | A1* | 11/2015 | Kim | H04W 36/36 |
| | | | | 370/329 |
| 2015/0351116 | A1* | 12/2015 | Shoshan | H04B 7/15542 |
| | | | | 370/330 |
| 2016/0241413 | A1* | 8/2016 | Koskinen | H04W 76/002 |
| 2016/0302048 | A1* | 10/2016 | Suzuki | H04W 4/10 |
| 2017/0181062 | A1* | 6/2017 | Kim | H04W 4/06 |
| 2017/0295054 | A1* | 10/2017 | Lee | H04W 24/10 |
| 2017/0295509 | A1* | 10/2017 | Lee | H04L 12/1881 |
| 2017/0325277 | A1* | 11/2017 | Fujishiro | H04W 4/06 |
| 2018/0014246 | A1* | 1/2018 | Chang | H04W 4/06 |
| 2018/0077631 | A1* | 3/2018 | Byun | H04W 4/06 |

OTHER PUBLICATIONS

Qualcomm Incorporated, "PTM Service Continuity", R2-150484, 3GPP TSG RAN WG2 #89, Athens, Greece, Feb. 9-13, 2015, Section 2.2.2.

LG Electronics Inc., "SCPTM service continuity", R2-150544, 3GPP TSG-RAN WG2 #89, Athens, Greece, Feb. 9-13, 2015, pp. 1-3.

Section 15, 3GPP TS 36.300 V12.5.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", Mar. 2015, pp. 127-146.

* cited by examiner

METHOD AND APPARATUS FOR HANDLING L2 ENTITY IN CONTINUITY BETWEEN SC-PTM TRANSMISSION AND MBSFN TRANSMISSION IN WIRELESS COMMUNICATION SYSTEM

CROSS-REFERENCE TO RELATED APPLICATIONS

This application is the National Stage filing under 35 U.S.C. 371 of International Application No. PCT/KR2016/003769, filed on Apr. 11, 2016, which claims the benefit of U.S. Provisional Application No. 62/145,495 filed on Apr. 9, 2015, the contents of which are all hereby incorporated by reference herein in their entirety.

BACKGROUND OF THE INVENTION

Field of the Invention

The present invention relates to wireless communications, and more particularly, to a method and apparatus for handling a L2 entity in continuity between single cell point-to-multipoint (SC-PTM) transmission and multicast-broadcast single-frequency network (MBSFN) transmission in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

The 3GPP LTE can provide a multimedia broadcast multicast service (MBMS). The MBMS is a service which simultaneously transmits data packets to multiple users. If a specific level of users exists in the same cell, the respective users can be allowed to share necessary resources so that the plurality of users can receive the same multimedia data, thereby increasing resource efficiency. In addition, a multimedia service can be used with a low cost from the perspective of users.

Enhanced MBMS (eMBMS) was developed to efficiently deliver multicast services over areas typically spanning multiple cells. eMBMS was original designed for the provision of media content in a large pre-planned area, for e.g. mobile TV. The eMBMS transmission will occupy the entire system bandwidth, and multiplexing with unicast in the same subframe is not allowed even though not all the radio resources in frequency domain are utilized. Radio resources configured for eMBMS might be unnecessarily wasted when provision services for critical communications.

There may be a number of applications that may benefit from supporting multicast services over a single cell. Accordingly, a single-cell point-to-multipoint (SC-PTM) transmission has been discussed for radio efficiency enhancements. SC-PTM uses the eMBMS system architecture, providing enhancements in the air interface to improve radio efficiency and to reduce latency. SC-PTM supports broadcast/multicast services over single cell, and the broadcast/multicast area can be dynamically adjusted cell by cell according to user's distribution.

According to situations, a transport channel on which a UE receives MBMS service may change. In this case, how to handle L2 entity may need to be clearly defined.

SUMMARY OF THE INVENTION

The present invention provides a method and apparatus for handling a L2 entity in continuity between single cell point-to-multipoint (SC-PTM) transmission and multicast-broadcast single-frequency network (MBSFN) transmission in a wireless communication system.

In an aspect, a method for handling, by a user equipment (UE), a L2 entity in a wireless communication system is provided. The method includes receiving a service via a first transport channel, changing a type of a transport channel from the first transport channel to a second transport channel, determining whether to re-establish a L2 entity, and receiving the service via the second transport channel.

In another aspect, a user equipment (UE) in a wireless communication system is provided. The UE includes a memory, a transceiver, and a processor coupled to the memory and the transceiver. The processor is configured to control the transceiver to receive a service via a first transport channel, change a type of a transport channel from the first transport channel to a second transport channel, determine whether to re-establish a L2 entity, and control the transceiver to receive the service via the second transport channel.

Service interruption in user equipment (UE) capable of receiving SC-PTM for the service addressed by temporary mobile group identity (TMGI) and session identifier (ID) can be reduced.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
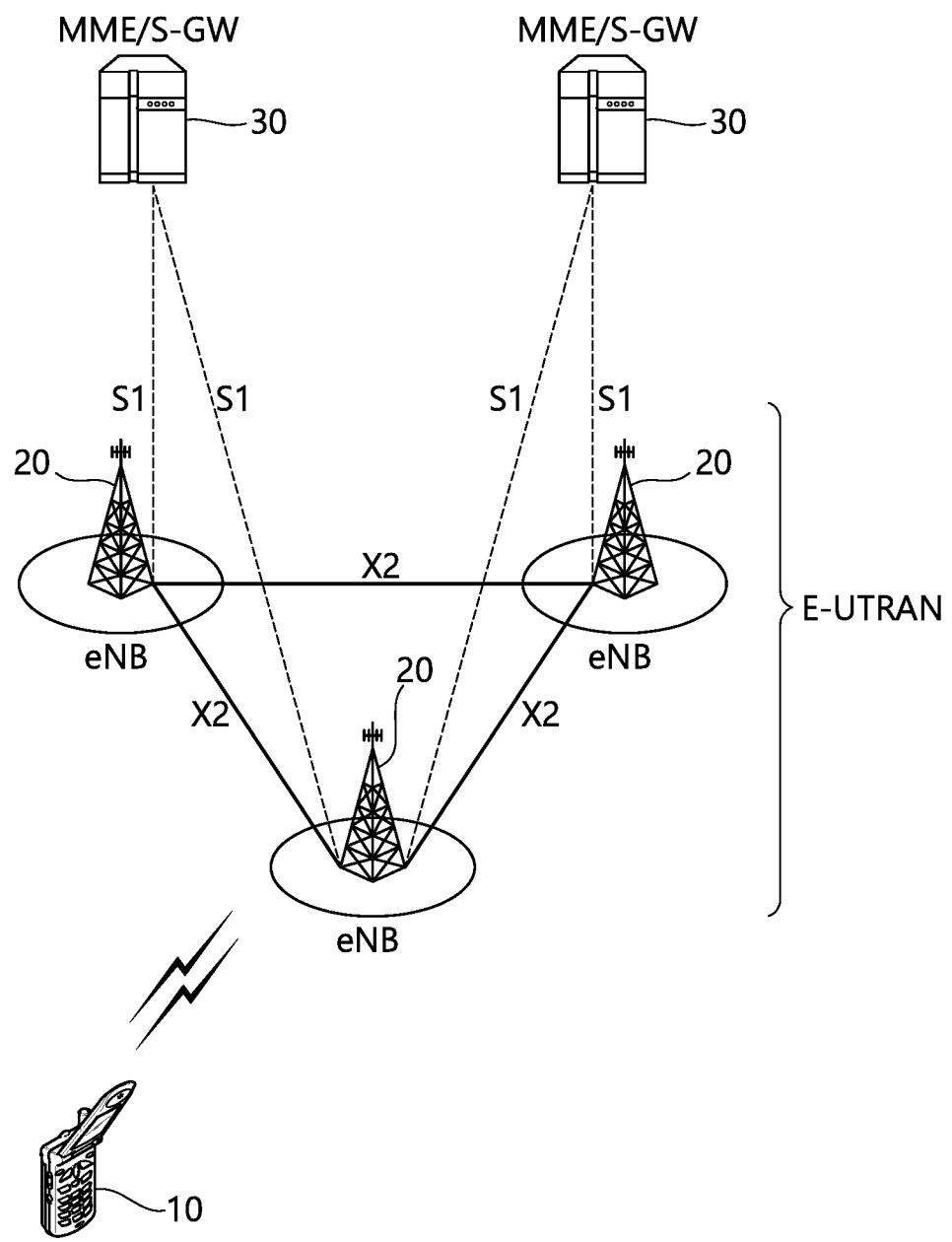
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
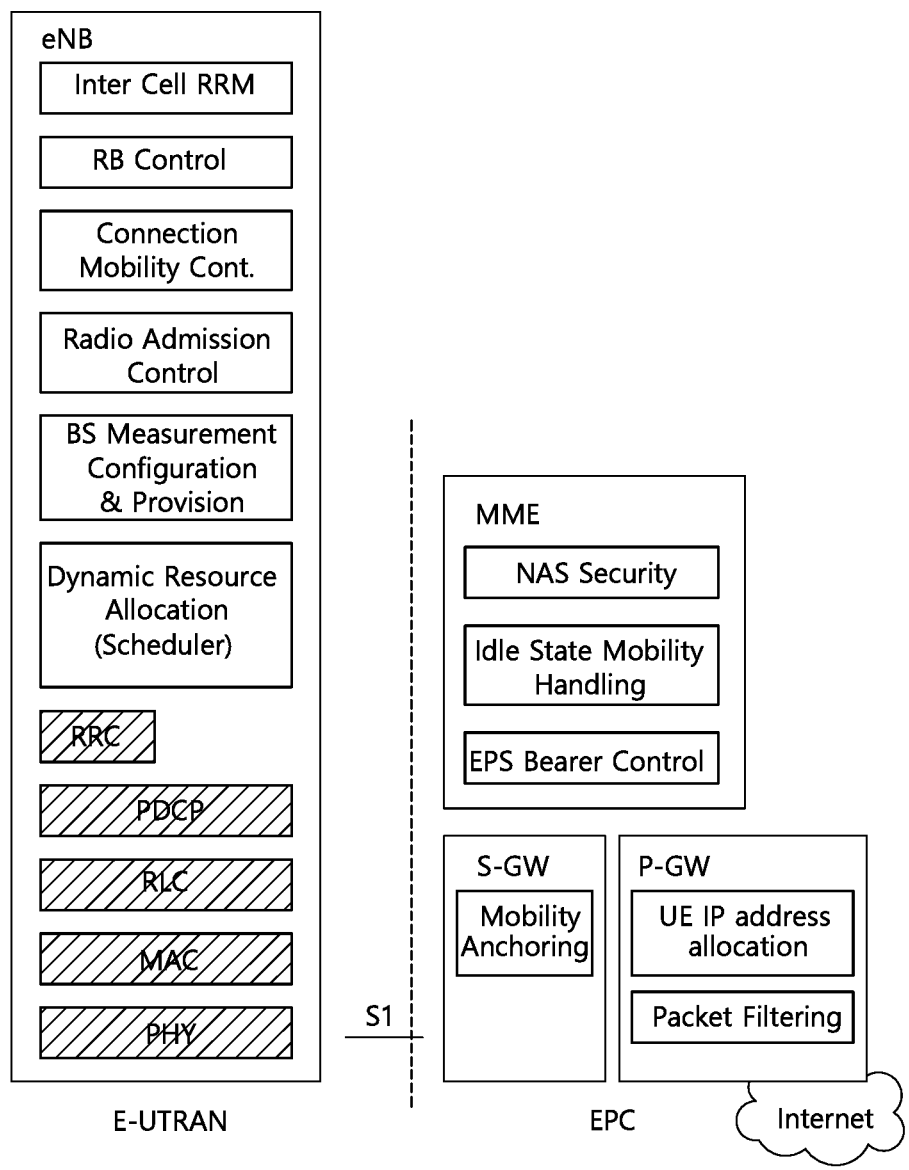
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
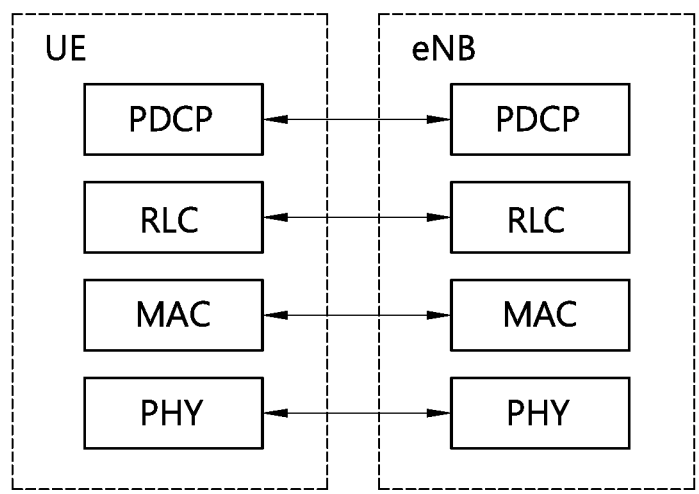
FIG. 3 shows a block diagram of a user plane protocol stack of an LTE system.
Figure 4:
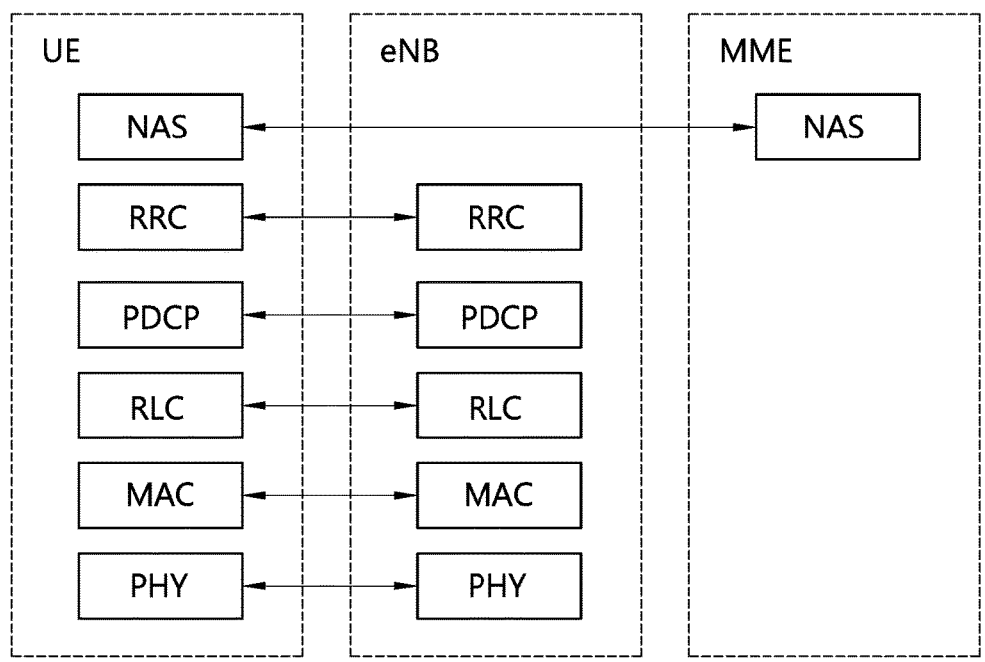
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e. between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
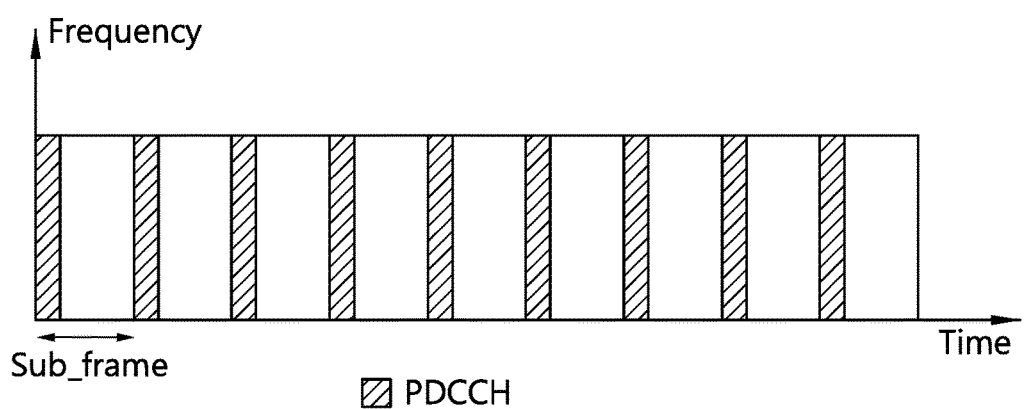
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

MBMS is described. It may be referred to Section 15 of 3GPP TS 36.300 V12.5.0 (2015-03).

Figure 6:
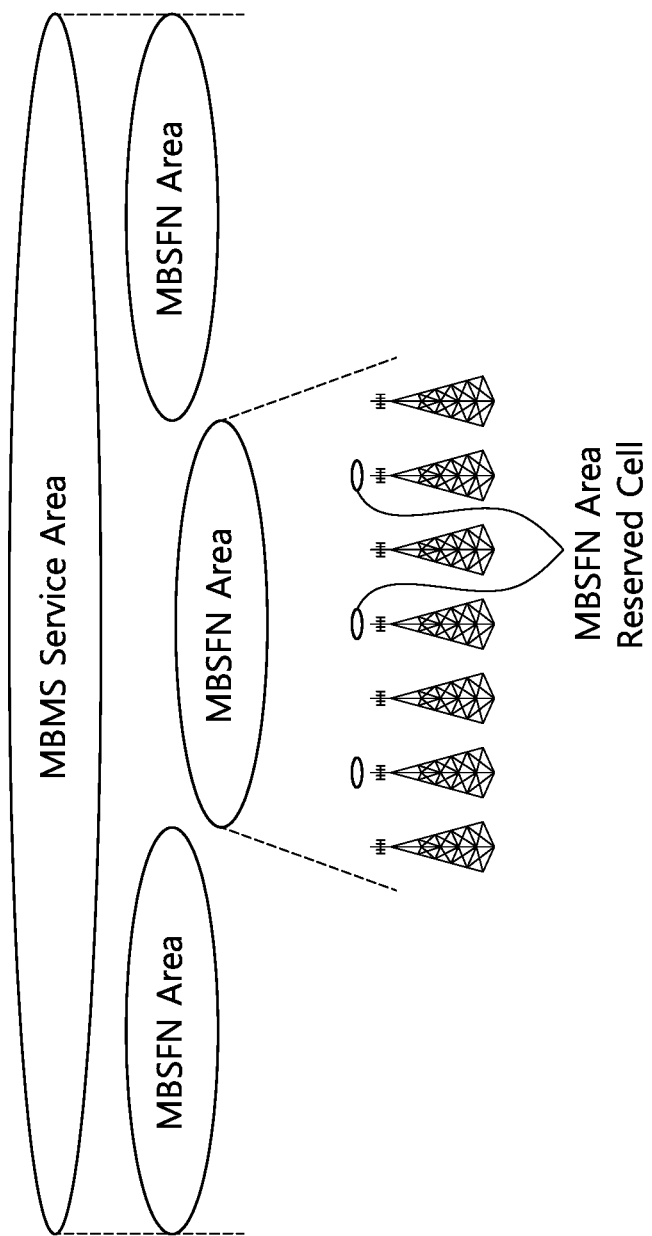
FIG. 6 shows MBMS definitions.

FIG. 6 shows MBMS definitions. For MBMS, the following definitions may be introduced.

Multicast-broadcast single-frequency network (MBSFN) synchronization area: This is an area of the network where all eNBs can be synchronized and perform MBSFN transmissions. MBSFN synchronization areas are capable of supporting one or more MBSFN areas. On a given frequency layer, an eNB can only belong to one MBSFN synchronization area. MBSFN synchronization areas are independent from the definition of MBMS service areas.

MBSFN transmission or a transmission in MBSFN mode: This is a simulcast transmission technique realized by transmission of identical waveforms at the same time from multiple cells. An MBSFN transmission from multiple cells within the MBSFN area is seen as a single transmission by a UE.

- MBSFN area: an MBSFN area consists of a group of cells within an MBSFN synchronization area of a network, which are coordinated to achieve an MBSFN transmission. Except for the MBSFN area reserved cells, all cells within an MBSFN area contribute to the MBSFN transmission and advertise its availability. The UE may only need to consider a subset of the MBSFN areas that are configured, i.e. when it knows which MBSFN area applies for the service(s) it is interested to receive.
- MBSFN area reserved cell: This is a cell within a MBSFN area which does not contribute to the MBSFN transmission. The cell may be allowed to transmit for other services but at restricted power on the resource allocated for the MBSFN transmission.
- Synchronization sequence: Each synchronization protocol data unit (SYNC PDU) contains a time stamp which indicates the start time of the synchronization sequence. For an MBMS service, each synchronization sequence has the same duration which is configured in the broadcast and multicast service center (BM-SC) and the multi-cell/multicast coordination entity (MCE).
- Synchronization period: The synchronization period provides the time reference for the indication of the start time of each synchronization sequence. The time stamp which is provided in each SYNC PDU is a relative value which refers to the start time of the synchronization period. The duration of the synchronization period is configurable.

In E-UTRAN, MBMS can be provided with single frequency network mode of operation (MBSFN) only on a frequency layer shared with non-MBMS services (set of cells supporting both unicast and MBMS transmissions i.e. set of "MBMS/Unicast-mixed cells"). MBMS reception is possible for UEs in RRC_CONNECTED or RRC_IDLE states. Whenever receiving MBMS services, a user shall be notified of an incoming call, and originating calls shall be possible. Robust header compression (ROHC) is not supported for MBMS.

In E-UTRAN, MBMS is only supported in a carrier shared with unicast traffic. Cells performing MBMS transmissions are referred to as MBMS/Unicast-mixed cells. MBMS is not supported for home eNB (HeNB). For MBMS/Unicast mixed cells, MTCH and MCCH are mapped on MCH for MBSFN transmission, and transmission of both unicast and MBMS in the cell is done in a co-ordinated manner.

For MBMS transmission, multi-cell transmission is supported. Multi-cell transmission of MBMS is characterized by:

- Synchronous transmission of MBMS within its MBSFN area;
- Combining of MBMS transmission from multiple cells is supported;
- Scheduling of each MCH is done by the MCE;
- A single transmission is used for MCH (i.e. neither blind HARQ repetitions nor RLC quick repeat);
- A single transport block (TB) is used per TTI for MCH transmission, that TB uses all the MBSFN resources in that subframe;
- MTCH and MCCH can be multiplexed on the same MCH and are mapped on MCH for p-t-m (point-to-multipoint) transmission;
- MTCH and MCCH use the RLC unacknowledged mode (UM) mode;
- The MAC subheader indicates the logical channel ID (LCID) for MTCH and MCCH;
- The MBSFN synchronization area, the MBSFN area, and the MBSFN cells are semi-statically configured, e.g. by operation and maintenance (O&M);
- MBSFN areas are static, unless changed by O&M (i.e. no dynamic change of areas);

Further, for MBMS transmission, single-cell transmission is supported. Single-cell transmission for MBMS transmission is called a single-cell point-to-multipoint (SC-PTM) transmission. SC-PTM transmission is especially suitable for scenarios where broadcast/multicast service is expected to be delivered to a limited number of cells due to user interests and the concerned cells may dynamically change due to user movement. SC-PTM transmission allows efficient radio utilization and flexible deployment of number of applications, e.g. critical communications, traffic information for cars and on-demand TV services, etc.

For MBMS/Unicast mixed cells, a single-cell multicast traffic channel (SC-MTCH) and a single-cell multicast control channel (SC-MCCH) may be mapped on DL-SCH for SC-PTM transmission. The SC-MTCH is a point-to-multipoint DL channel for transmitting traffic data from the network to the UE using SC-PTM transmission. This channel is only used by UEs that receive MBMS using SC-PTM transmission. The SC-MCCH is a point-to-multipoint DL channel used for transmitting MBMS control information from the network to the UE, for one or several SC-MTCHs. This channel is only used by UEs that receive or are interested to receive MBMS using SC-PTM transmission.

Transmission of a MBMS in E-UTRAN uses either MBSFN transmission or SC-PTM transmission. The MCE may make the decision on whether to use SC-PTM transmission or MBSFN transmission for each MBMS session.

Single-cell transmission of MBMS may be characterized by:

- MBMS is transmitted in the coverage of a single cell;
- One SC-MCCH and one or more SC-MTCH(s) are mapped on DL-SCH;
- Scheduling is done by the eNB;
- SC-MCCH and SC-MTCH transmissions are each indicated by a logical channel specific radio network temporary identity (RNTI) on PDCCH (there is a one-to-one mapping between a temporary mobile group identity (TMGI) and group RNTI (G-RNTI) used for the reception of the DL-SCH to which a SC-MTCH is mapped);
- A single transmission is used for DL-SCH (i.e. neither blind HARQ repetitions nor RLC quick repeat) on which SC-MCCH or SC-MTCH is mapped;
- SC-MCCH and SC-MTCH use the RLC-UM mode.

Assuming that SC-PTM transmission is used for a MBMS service, the network may be able to select one of the following three transmission types for the same service: MBSFN transmission on MCH, SC-PTM transmission on DL-SCH, or unicast transmission on DL-SCH. The network may be able to change a transmission type at a cell, e.g. depending on the number of UEs receiving the service. And, the network may configure different transmission types at different cells. Hence, UEs may be able to receive the service in one of SC-PTM transmission, MBSFN transmission and unicast transmission, while staying at the same cell or moving across cells.

In this sense, there may be three service continuity scenarios involving SC-PTM transmission, i.e. between SC-PTM transmissions, between SC-PTM transmission and MBSFN transmission, and between SC-PTM transmission and unicast transmission. However, in the description below, service continuity scenario between SC-PTM transmission and MBSFN transmission is only focused.

Figure 7:
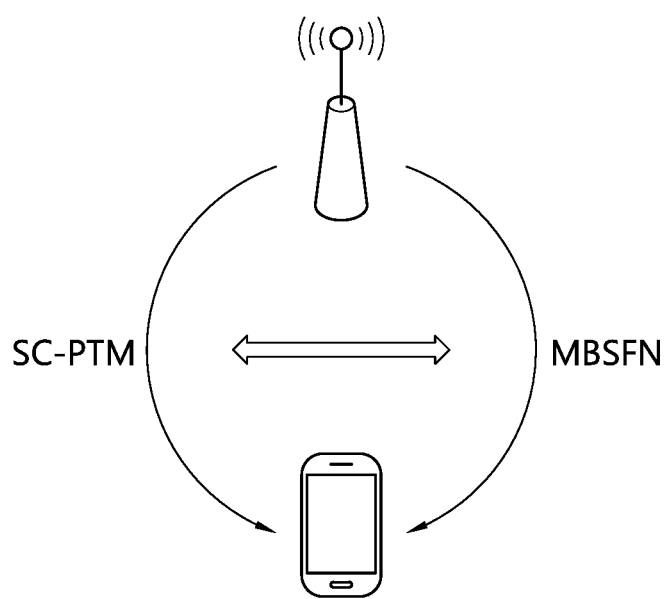
FIG. 7 shows intra-tell transmission type switching between SC-PTM transmission and MBSFN transmission.

FIG. 7 shows intra-tell transmission type switching between SC-PTM transmission and MBSFN transmission. Referring to FIG. 7, the network may be able to switch transmission type between SC-PTM transmission and MBSFN transmission. For instance, if several adjoining cells participate in transmission of the same service, the network may configure a MBSFN area to broadcast the service. But if only a few cells participate in transmission of the service, or if cells participating in transmission of the service are sparsely scattered and not adjoining, the network may configure one or more SC-PTM cells. Accordingly, the network may be able to switch transmission type between SC-PTM transmission and MBSFN transmission at a cell for a service. However, this scenario may not happen if network synchronization required for MBSFN is not supported by the network.

Figure 8:
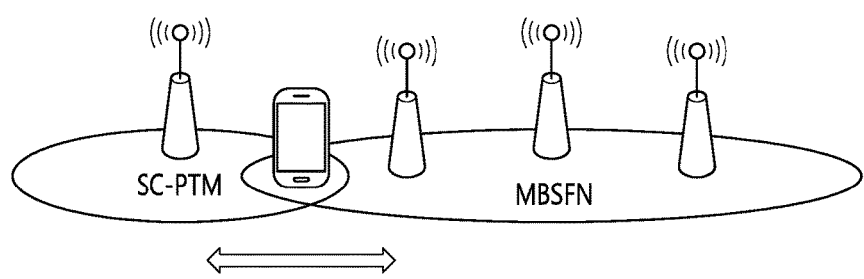
FIG. 8 shows inter-cell mobility between SCPTM cell and MBSFN area.

FIG. 8 shows inter-cell mobility between SCPTM cell and MBSFN area. Referring to FIG. 8, if the network can switch between SC-PTM transmission and MBSFN transmission at a cell, there may be the case that the UE moves from SC-PTM cell to MBSFN cell or vice versa. For instance, the network may configure a MBSFN area covering adjoining cells while configuring SC-PTM cells that are not adjacent to the MBSFN area for the same service. If it is the case, the UE needs to support mobility between SC-PTM transmission and MBSFN transmission. However, mobility between SC-PTM cell and MBSFN area may not frequently happen because it may be only observed at the boundary of MBSFN area which is not so dynamically configured.

As described above, a UE may receive an interested service via SC-MTCH mapped on DL-SCH (i.e. SC-PTM transmission) or via MTCH mapped on MCH (i.e. MBSFN transmission). If a UE is receiving an interested service via MTCH on MCH, the UE may maintain a L2 entity for reception of MTCH on MCH while the UE is moving across cells within a MBSFN area. However, if a UE is receiving an interested service via SC-MTCH on DL-SCH, a UE may need to re-establish the L2 entity. In this case, service interruption is expected in UE mobility, which is not desirable.

In order to solve the problem described above, a method for handling L2 entity in service continuity between SC-PTM transmission and MBSFN transmission according to an embodiment of the present invention is described below.

(1) First Embodiment: SC-PTM Transmission->MBSFN Transmission

Figure 9:
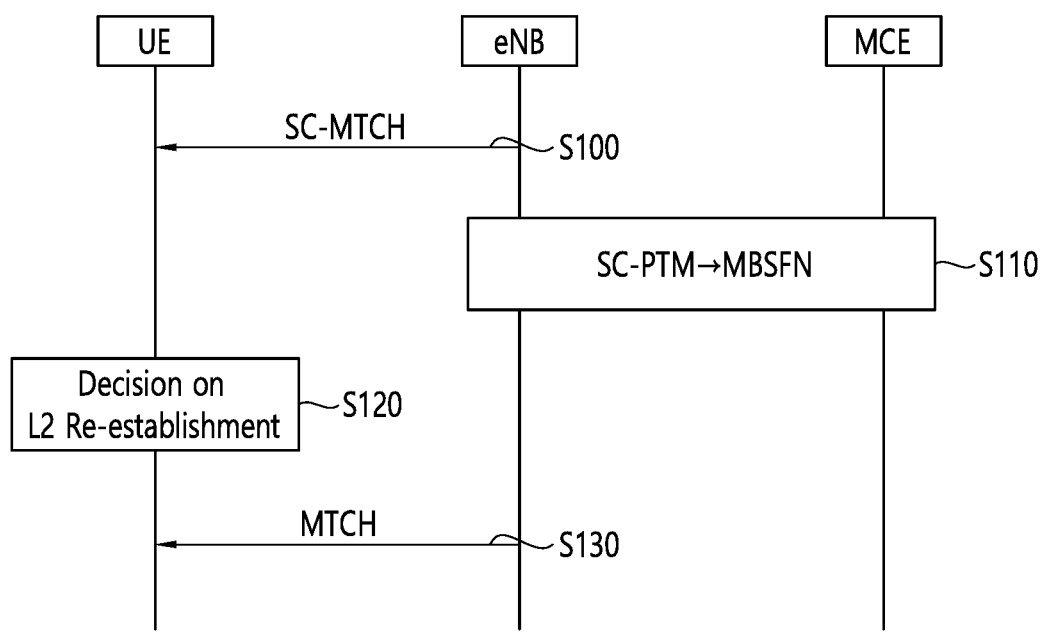
FIG. 9 shows an example of change from SC-PTM transmission to MBSFN transmission according to an embodiment of the present invention.

FIG. 9 shows an example of change from SC-PTM transmission to MBSFN transmission according to an embodiment of the present invention.

In step S100, the UE is receiving a service via SC-MTCH mapped on DL-SCH from the eNB. In step S110, the MCE decides to use MBSFN transmission over SC-PTM transmission.

When the UE changes from DL-SCH reception at a cell to MCH reception at a MBSFN area for the same service, in step S120, the UE decides on re-establish the L2 entity. More specifically, if the cell belongs to the MBSFN area, the UE may maintain L2 entity, i.e. no re-establishment upon this change. The UE may apply a new logical channel identity for the MTCH according to RRC message for SC-PTM transmission. Alternatively, if the cell does not belong to the MBSFN area, or the eNB indicates re-establishment, the UE may re-establish the L2 entity. The UE may apply a new logical channel identity for the MTCH according to RRC message for SC-PTM transmission.

The UE may check whether or not the cell belongs to the MBSFN area by checking SIB 13 broadcast by the cell. If SIB 13 broadcast by the cell serving the SC-PTM transmission includes the MBSFN area ID corresponding to the MBSFN area where MCH is to be received for the same service, the UE may determine that the cell belongs to the MBSFN area. Otherwise, the UE may determine that the cell does not belong to the MBSFN area. Further, if the UE changes in RRC_CONNECTED, the eNB may indicate whether or not to re-establish RLC/PDCP entity or whether or not the cell belongs to the MBSFN area.

In step S130, the UE receives the same service via MTCH mapped on MCH from the eNB.

(2) Second Embodiment: MBSFN Transmission->SC-PTM Transmission

Figure 10:
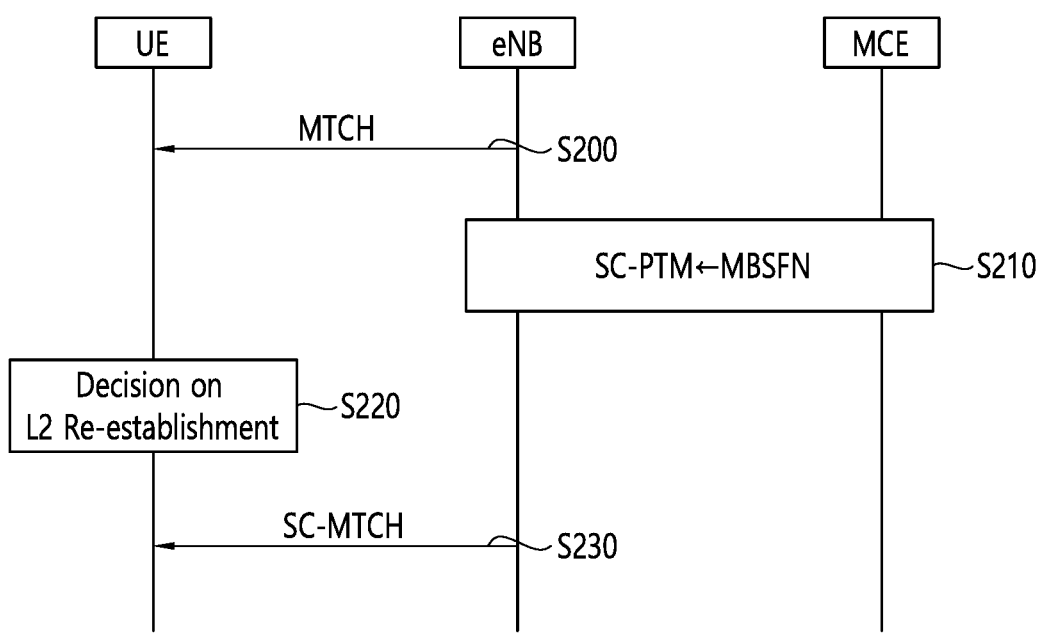
FIG. 10 shows an example of change from MBSFN transmission to SC-PTM transmission according to an embodiment of the present invention.

FIG. 10 shows an example of change from MBSFN transmission to SC-PTM transmission according to an embodiment of the present invention.

In step S200, the UE is receiving a service via MTCH mapped on MCH from the eNB. In step S210, the MCE decides to use SC-PTM transmission over MBSFN transmission.

When the UE changes from MCH reception at a MBSFN area to DL-SCH reception at a cell for the same service, in step S220, the UE decides on re-establish the L2 entity. More specifically, if the cell belongs to the MBSFN area, the UE may maintain L2 entity, i.e. no re-establishment upon this change. The UE may apply a new logical channel identity for the MTCH according to RRC message for SC-PTM transmission. Alternatively, if the cell does not belong to the MBSFN area, or the eNB indicates re-establishment, the UE may re-establish the L2 entity. The UE may apply a new logical channel identity for the MTCH according to RRC message for SC-PTM transmission.

The UE may check whether or not the cell belongs to the MBSFN area by checking SIB 13 broadcast by the cell. If SIB 13 broadcast by the cell serving the SC-PTM transmission includes the MBSFN area ID corresponding to the MBSFN area where MCH is to be received for the same service, the UE may determine that the cell belongs to the MBSFN area. Otherwise, the UE may determine that the cell does not belong to the MBSFN area. Further, if the UE changes in RRC_CONNECTED, the eNB may indicate whether or not to re-establish RLC/PDCP entity or whether or not the cell belongs to the MBSFN area.

In step S230, the UE receives the same service via SC-MTCH mapped on DL-SCH from the eNB.

(3) Third Embodiment: SC-PTM
Transmission->SC-PTM Transmission

Figure 11:
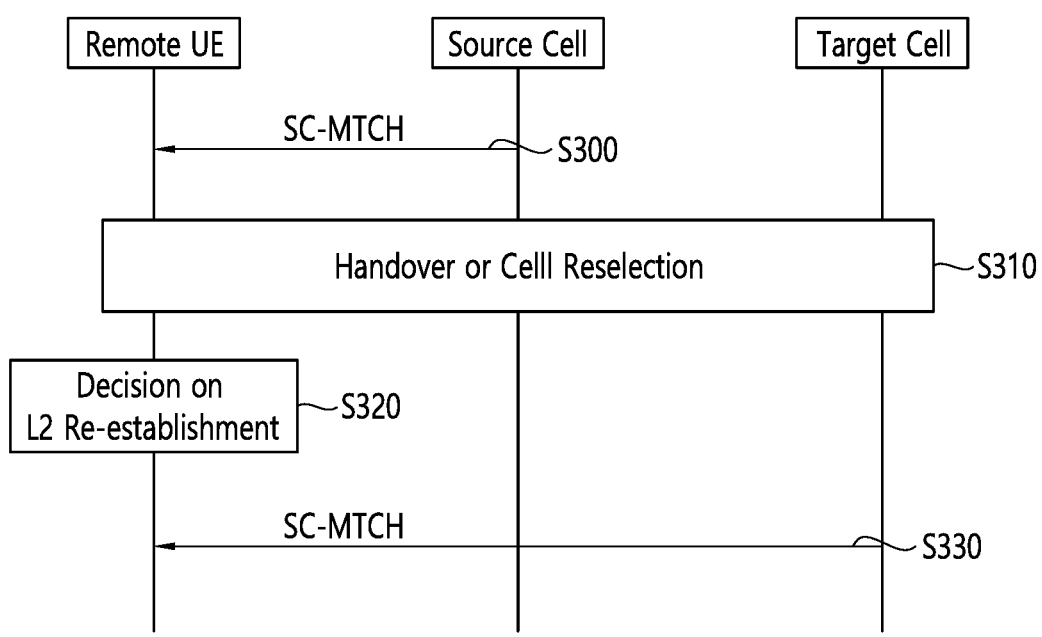
FIG. 11 shows an example of change from SC-PTM transmission to another SC-PTM transmission according to an embodiment of the present invention.

FIG. 11 shows an example of change from SC-PTM transmission to another SC-PTM transmission according to an embodiment of the present invention.

In step S300, the UE is receiving a service via SC-MTCH mapped on DL-SCH from the source cell. In step S310, handover or cell reselection is performed.

When the UE changes from DL-SCH reception at the source cell to DL-SCH reception at the target cell for the same service, in step S320, the UE decides on re-establish the L2 entity. More specifically, if both the source cell and target cell belong to the same MBSFN area, the UE may maintain L2 entity, i.e. no re-establishment upon this change. The UE may maintain a logical channel identity. Alternatively, if the source cell and target cell do not belong to the same MBSFN area, or the eNB indicates re-establishment, the UE may re-establishes the L2 entity. The UE may apply a new logical channel identity for the MTCH according to RRC message for SC-PTM transmission.

The UE may check whether or not the cell belongs to the same MBSFN area by checking SIB 13 broadcast by the cell. If one SIB 13 broadcast by the source cell and another SIB 13 broadcast by the target cell include the same MBSFN area ID, the UE may determine that the both the source cell and target cell belong to the same MBSFN area. Otherwise, the UE may determine that both the source cell and target cell do not belong to the same MBSFN area. Further, if the UE changes in RRC_CONNECTED, the eNB may indicate whether or not to re-establish RLC/PDCP entity or whether or not the cell belongs to the MBSFN area.

Figure 12:
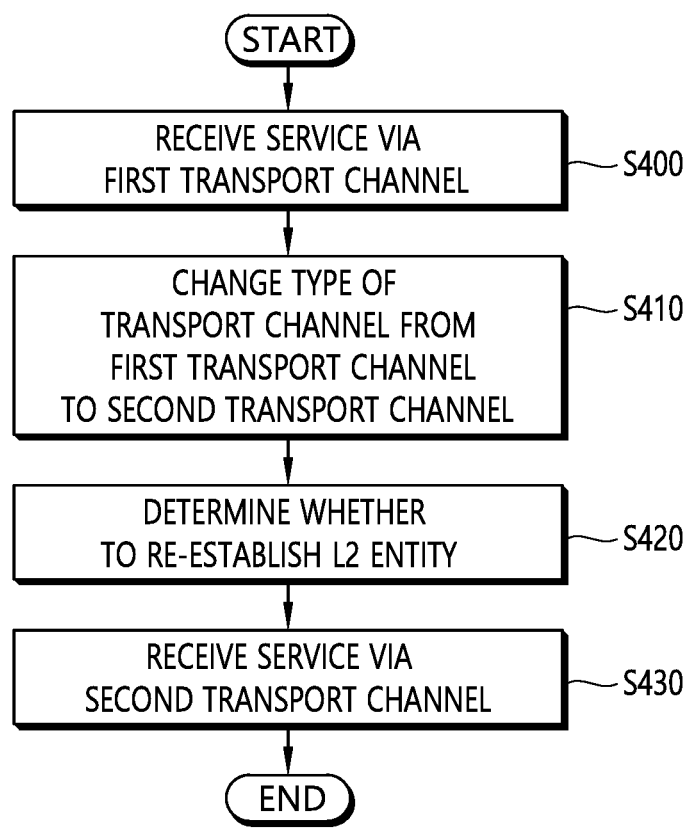
FIG. 12 shows a method for handling, by a UE, a L2 entity according to an embodiment of the present invention.

FIG. 12 shows a method for handling, by a UE, a L2 entity according to an embodiment of the present invention. In step S400, the UE receives a service via a first transport channel. In step S410, the UE changes a type of a transport channel from the first transport channel to a second transport channel. In step S420, the UE determines whether to re-establish a L2 entity. In step S430, the UE receives the service via the second transport channel.

The type of the transport channel may be changed when a MCE decides to use MBSFN transmission over SC-PTM transmission for the service. This case corresponds to the first embodiment of the present invention described above, by referring to FIG. 9. That is, the first transport channel may be a DL-SCH at a cell, and the second transport channel may be a MCH at a MBSFN area. It may be determined not to re-establish the L2 entity if the cell belongs to the MBSFN area. In this case, a SIB 13 broadcast by the cell may include a MBSFN are ID corresponding to the MBSFN area where the MCH is to be received for the service. Further, it may be determined to re-establish the L2 entity if the cell does not belong to the MBSFN area. In this case, a SIB 13 broadcast by the cell may not include a MBSFN are ID corresponding to the MBSFN area where the MCH is to be received for the service.

Alternatively, the type of the transport channel may be changed when a MCE decides to use SC-PTM transmission over MBSFN transmission for the service. This case corresponds to the second embodiment of the present invention described above, by referring to FIG. 10. That is, the first transport channel may a MCH at a MBSFN area, and the second transport channel may be a DL-SCH at a cell. It may be determined not to re-establish the L2 entity if the cell belongs to the MBSFN area. In this case, a SIB 13 broadcast by the cell may include a MBSFN are ID corresponding to the MBSFN area where the MCH is to be received for the service. Further, it may be determined to re-establish the L2 entity if the cell does not belong to the MBSFN area. In this case, a SIB 13 broadcast by the cell may not include a MBSFN are ID corresponding to the MBSFN area where the MCH is to be received for the service.

Figure 13:
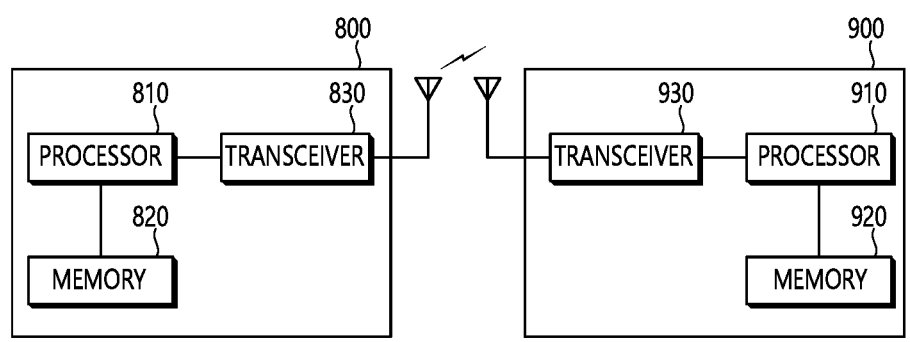
FIG. 13 shows a wireless communication system to implement an embodiment of the present invention.

Alternatively, the type of the transport channel may be changed when a handover or a cell reselection is performed. This case corresponds to the third embodiment of the present invention described above, by referring to FIG. 11. That is, the first transport channel may be a first DL-SCH at a source cell, and the second transport channel may be a second DL-SCH at a target cell. It may be determined not to re-establish the L2 entity if both the source cell and the target cell belong to a same MBSFN area. In this case, one SIB 13 broadcast by the source cell and another SIB 13 broadcast by the target cell may include the same MBSFN area ID. Further, it may be determined to re-establish the L2 entity if both the source cell and the target cell do not belong to a same MBSFN area. In this case, one SIB 13 broadcast by the source cell and another SIB 13 broadcast by the target cell do not include the same MBSFN area ID, FIG. 13 shows a wireless communication system to implement an embodiment of the present invention.

An eNB 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal. The transceiver 830 may provide SC-PTM transmission via SC-MTCH on DL-SCH and/or MBSFN transmission via MTCH on MCH.

A UE 900 includes a processor 910, a memory 920 and a transceiver 930. The processor 910 may be configured to implement proposed functions, procedures and/or methods described in this description. That is, the processor 910 may change a type of a transport channel from the first transport channel to a second transport channel, and determine whether to re-establish a L2 entity. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for maintaining, by a user equipment (UE), an L2 entity in a wireless communication system, the method comprising:
   receiving a service via a downlink shared channel (DL-SCH) on a cell;
   changing the transport channel from the DL-SCH to a multicast channel (MCH);
   when the cell belongs to a multicast-broadcast single-frequency network (MBSFN) area, maintaining the L2 entity; and
   receiving the service via the MCH in the MBSFN area, wherein the L2 entity is not re-established when the transport channel changes from the DL-SCH to the MCH.

2. The method of claim 1, wherein the transport channel changes from the DL-SCH to the MCH when a multi-cell/multicast coordination entity (MCE) decides to use an MBSFN transmission over a single cell point-to-multipoint (SC-PTM) transmission for the service.

3. The method of claim 1, wherein a system information block 13 (SIB 13) broadcast by the cell includes an MBSFN area ID related to the MBSFN area where the MCH is to be received for the service.

4. The method of claim 1, further comprising:
   when the cell does not belong to the MBSFN area, re-establishing the L2 entity.

5. The method of claim 4, wherein a SIB 13 broadcast by the cell does not include an MBSFN area ID related to the MBSFN area where the MCH is to be received for the service.

6. The method of claim 1, wherein the DL-SCH is mapped on a single-cell multicast traffic channel (SC-MTCH), and the MCH is mapped on an MTCH.

7. A user equipment (UE) in a wireless communication system, the UE comprising:
   a memory;
   a transceiver; and
   a processor coupled to the memory and the transceiver, wherein the processor is configured to:
   control the transceiver to receive a service via a downlink shared channel (DL-SCH) on a cell,
   change the transport channel from the DL-SCH to a multicast channel (MCH),
   when the cell belongs to a multicast-broadcast single-frequency network (MBSFN) area, maintain the L2 entity,
   control the transceiver to receive the MCH in the MBSFN area, and
   wherein the L2 entity is not re-established by changing the type of the transport channel.

* * * * *